United States Patent
Chang

(10) Patent No.: US 7,095,532 B2
(45) Date of Patent: Aug. 22, 2006

(54) SCANNING APPARATUS

(76) Inventor: Yu-Shan Chang, No. 1-2, Sec. 3, Wuchiuan W. Rd., Taichung (TW)

(*) Notice: Subject to any disclaimer, the term of this patent is extended or adjusted under 35 U.S.C. 154(b) by 848 days.

(21) Appl. No.: 10/263,178

(22) Filed: Oct. 3, 2002

(65) Prior Publication Data

US 2004/0066540 A1    Apr. 8, 2004

(51) Int. Cl.
*H04N 1/40* (2006.01)
*H04N 1/04* (2006.01)
*H01B 7/08* (2006.01)
*H02G 3/00* (2006.01)

(52) U.S. Cl. .................. 358/471; 358/474; 358/483; 358/487; 358/497; 174/99 R; 174/117 FF

(58) Field of Classification Search ................ 358/497, 358/494, 474, 471, 487, 486, 483, 482, 505, 358/506, 512–514; 250/216, 234–236, 208.1; 399/211, 212; 174/99 R; 382/318, 319, 382/312
See application file for complete search history.

(56) References Cited

U.S. PATENT DOCUMENTS

| | | | |
|---|---|---|---|
| 4,987,442 A * | 1/1991 | Uemori | 355/50 |
| 6,330,084 B1 * | 12/2001 | Chiang | 358/497 |
| 6,552,272 B1 * | 4/2003 | Sheng et al. | 174/117 FF |
| 6,576,840 B1 * | 6/2003 | Huang et al. | 174/69 |
| 6,717,702 B1 * | 4/2004 | Yamauchi et al. | 358/497 |
| 6,903,849 B1 * | 6/2005 | Yokota | 358/497 |
| 6,953,898 B1 * | 10/2005 | Chen et al. | 174/99 R |
| 6,958,830 B1 * | 10/2005 | Kono | 358/443 |
| 6,975,436 B1 * | 12/2005 | Saito | 358/497 |
| 2006/0033775 A1 * | 2/2006 | Tsai et al. | 347/50 |

* cited by examiner

*Primary Examiner*—Cheukfan Lee
(74) *Attorney, Agent, or Firm*—Berkeley Law & Technology Group, LLC

(57) ABSTRACT

A scanning apparatus includes a housing with a flatbed. A loading glass is installed at the scan flatbed for loading a to-be-scanned document. A photoelectric sensing device is disposed in the housing for sensing the light signals corresponding to the to-be-scanned document to generate electric signals. The electric signals are transmitted through a flat cable to a motherboard. When the photoelectric sensing device shifts and the flat cable touches the bottom of the housing, the first adsorptive slice of the flat cable and the second adsorptive slice on the bottom of the housing adsorb each other. Therefore, the rubbing between the flat cable and the loading glass can be avoided and the quality of the scanning images can be improved.

13 Claims, 4 Drawing Sheets

SCANNING APPARATUS

This application incorporates by reference Taiwanese application Serial No. 91116066, filed Jul. 18, 2002.

BACKGROUND OF THE INVENTION

1. Field of the Invention

The invention relates in general to a scanning apparatus, and more particularly to a scanning apparatus capable of reducing the abrasion of the loading glass and thus improving the quality of the scanning image.

2. Description of the Related Art

With the progress and evolution of technology, the integration and application of multi-media have become the current trend. Multimedia is the use of computers to present different types of information, such as text, images and sound, in an integrated way. Several multi-media devices capable of capturing images and sounds are therefore developed. In terms of the image processing, the scanning apparatus is a common tool for users to capture images.

Referring to FIG. 1A, a lateral view of a conventional flatbed scanner is shown. The flatbed scanner includes a housing 102, and a cover 104. The housing 102 includes a scan flatbed 106 or a so-called a window area. A loading glass 108 is installed at the scan flatbed 106 for loading a to-be-scanned document 111. The scanning operation is performed as the following. The to-be-scanned document 111 is placed on the scan flatbed 106 and then the cover 104 is closed. A photoelectric sensing device 110 in the housing 102 is driven to sense the to-be-scanned document 111. A light-sensing module 112 in the photoelectric sensing device 110 then transforms the received image signals to electric signals. The electric signals are further transmitted to a motherboard 116 by a flat cable 114 so that the images sensed by the light-sensing module 112 can be output. The light-sensing module 112 can be a charge coupled device (CCD) or a contact image sensor (CIS) to achieve the above-mentioned purpose.

After the first signals in the light-sensing module 112 are output, the photoelectric sensing device 110 is further shifted slightly to scan the left part of the to-be-scanned document 111 by a step motor (not shown). Subsequently, the light-sensing module 112 is driven again to sense the to-be-scanned document 111. The sensed image signals are then transmitted by the flat cable 114 and output by the motherboard 116. By performing the procedure mentioned above repeatedly, the scanning progress can be completed step by step. The procedures described above can be applied to both reflective documents and transmissive documents since these two kinds of documents are different in the locations of the light sources (not shown) but the same in the progress of photoelectric sensing devices 110 to sense the documents and the connection between the photoelectric sensing device 110 and the flat cable 114. Therefore, the theorems for capturing images of two kinds of documents are also the same.

Referring to FIG. 1A and FIG. 1B, a structural diagram of the connection between the photoelectric sensing device and the motherboard in a conventional flatbed scanner is shown. The flat cable 114, which is usually a soft cable, is located under the loading glass 108. The flat cable 114 is bent around the bottom of photoelectric sensing device 214; one terminal A of the flat cable 114 is connected to the photoelectric sensing device 110, and the other terminal B is connected to the motherboard 116. Therefore, in the natural condition, the flat cable 114 will form a raised part 118 with a height h. Because scanners nowadays are designed to be thinner and thinner, when scanners are fabricated, the raised part 118 of the flat cable 114 will easily touch the loading glass 108 at the scan flatbed 106 as shown in FIG. 1C. Subsequently, when the step motor drives photoelectric sensing device 110 to pre-scan or scan the to-be-scanned document 111, the raised part 118 of the flat cable 114 will rub against the loading glass 108 and result in friction traces at the loading glass 108 as time goes by. The friction traces on the loading glass 108 will obscure the light to penetrate and result in shadow traces on the scanning images. Therefore, the quality of scanning images is reduced largely.

SUMMARY OF THE INVENTION

It is therefore an object of the invention to provide a scanning apparatus. By adding adsorptive materials between the flat cable and the housing, the surface touch between the flat cable and the loading glass can be avoided so that the quality of the scanning images can be improved.

The invention achieves the above-identified objects by providing a scanning apparatus. The scanning apparatus has a housing with a scan flatbed, and a loading glass is installed at the scan flatbed for loading a to-be-scanned document. A photoelectric sensing device is disposed in the housing for sensing the light corresponding to the to-be-scanned document and transforming light signals into electric signals. A circuit board is disposed in the housing for outputting the electric signals. In addition, a flat cable connects the photoelectric sensing device to the circuit board and transmits the electric signals. The photoelectric sensing device is driven to scan the to-be-scanned document by repeating the procedure mentioned above and the scanning image is output to complete the scanning. The flat cable includes a first adsorptive slice and the bottom of the housing includes a second adsorptive slice. When the photoelectric sensing device is driven and the flat cable approaches the bottom of the housing, the first and the second adsorptive slices adsorb each other.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1A:
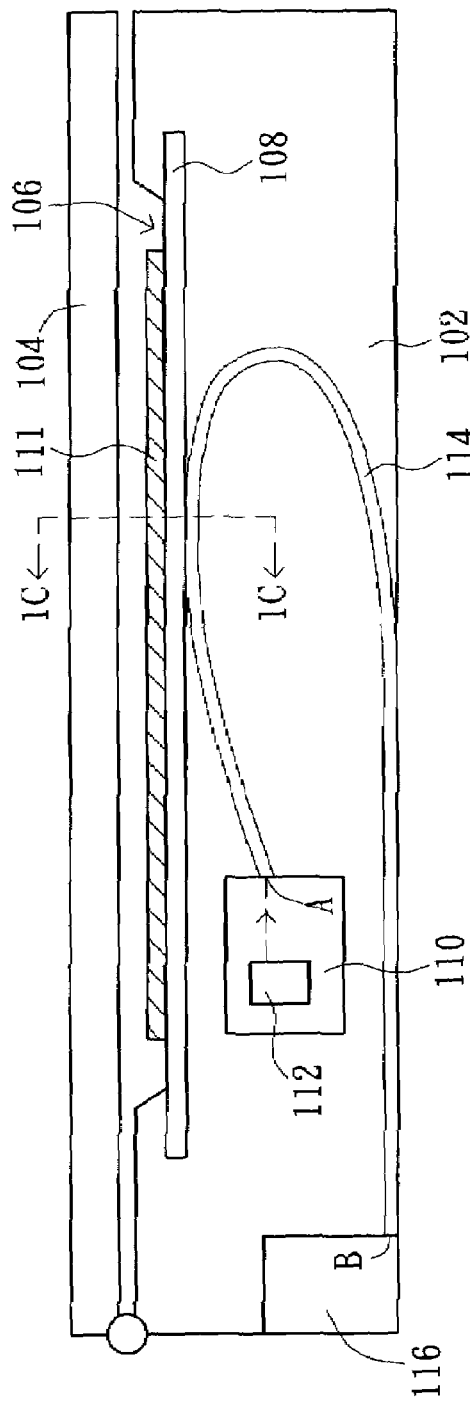
FIG. 1A (Prior Art) is a lateral view of a conventional flatbed scanner.
Figure 1C:
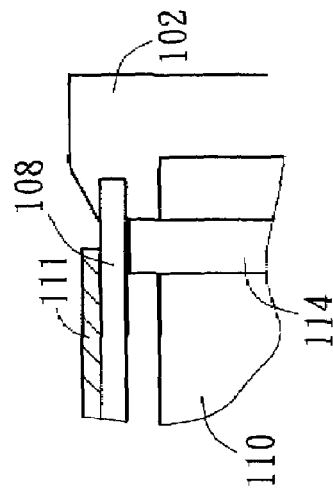
FIG. 1C (Prior Art) is a cross-sectional view of the conventional flatbed scanner, taken along line 1C–1C of FIG. 1A.
Figure 1B:
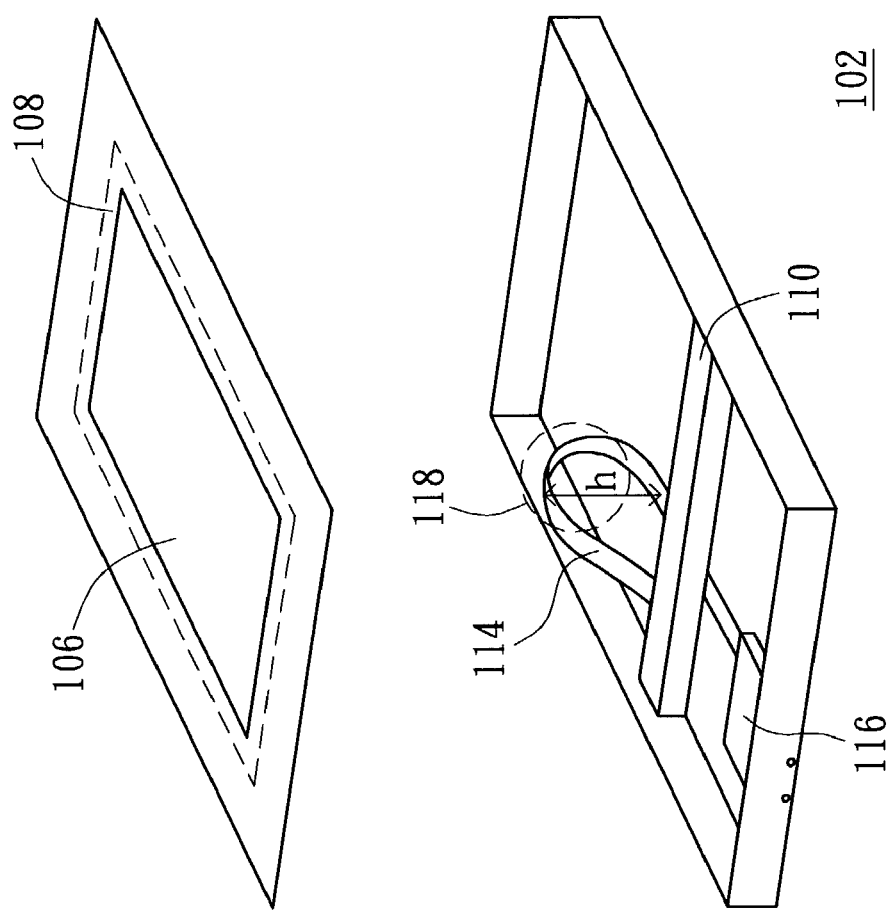
FIG. 1B (Prior Art) is a structural diagram showing the connection between the photoelectric sensing device and the motherboard in a conventional flatbed scanner.
Figure 2A:
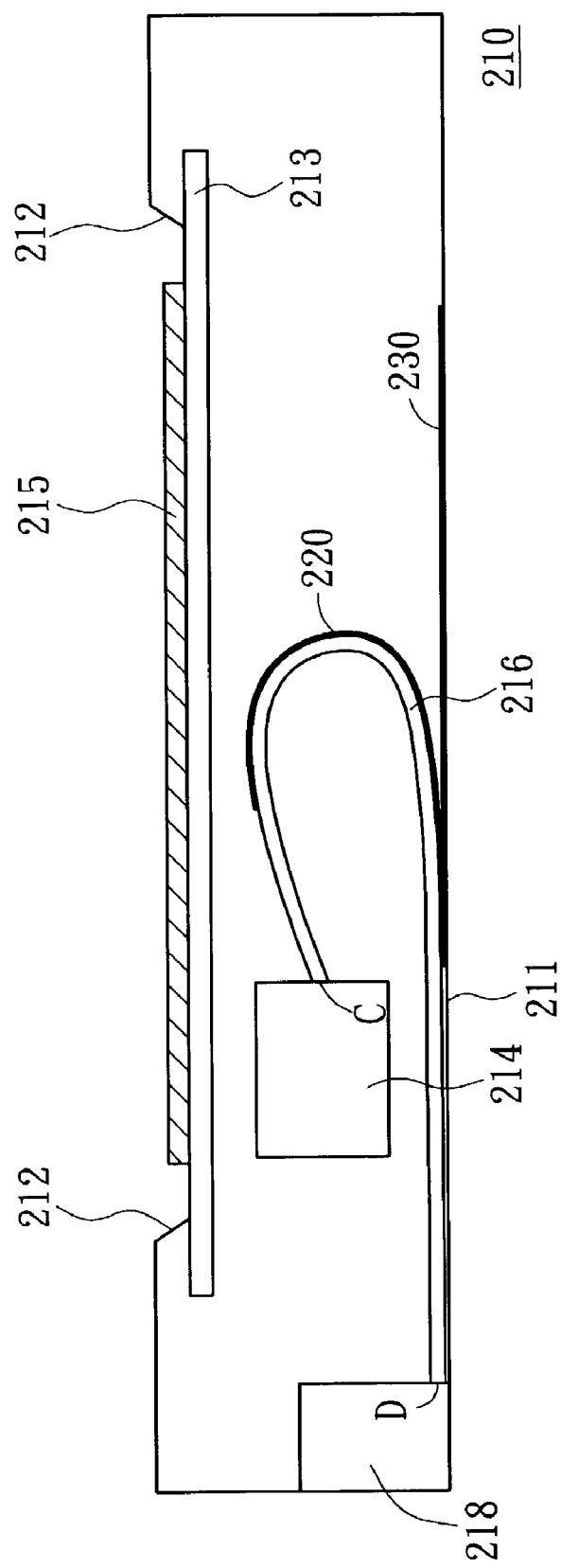
FIG. 2A is a lateral view of the scanning apparatus according to the preferred embodiment of the invention.

Referring to FIG. 2A, a lateral view of the scanning apparatus according to the first preferred embodiment of the invention is shown. The scanning apparatus 200 including a housing 210, a scan flatbed 212, a photoelectric sensing device 214, a flat cable 216, and a motherboard 218. A loading glass 213 is installed at the scan flatbed 212 for loading a to-be-scanned document 215. When the document 215 is to be scanned, light signals corresponding to the to-be-scanned document 215 are sensed and transformed to electric signals by the photoelectric sensing device 214. Moreover, the electric signals are transmitted to the motherboard 218 by the flat cable 216 and then the first image is generated. The photoelectric sensing device 214 is driven to scan the to-be-scanned document 215 by repeating the procedure mention above until the final scanning image is output to complete the scanning progress.

Figure 2B:
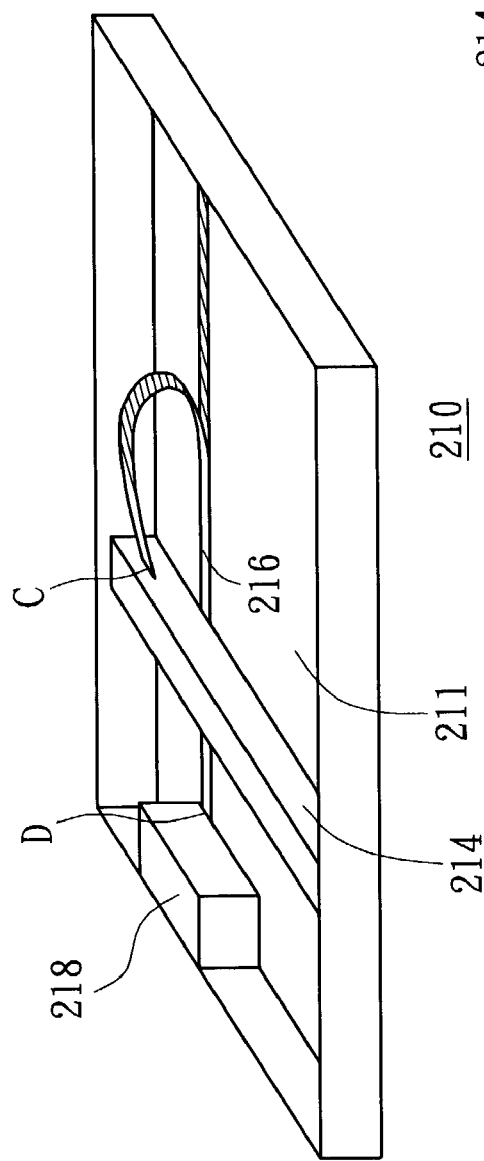
FIG. 2B is an inner structural diagram of the scanning apparatus according to the preferred embodiment of the invention.
Figure 2C:
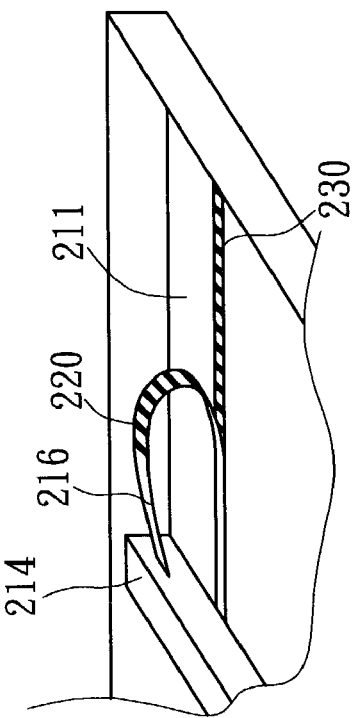
FIG. 2C shows that the first and the second adsorptive slices adsorbing each other section by section according to the preferred embodiment of the invention.

The flat cable 216 bent around the bottom of photoelectric sensing device 214 includes a first terminal C connected to the photoelectric sensing device 214 and a second terminal D connected to the motherboard 218. The main feature of the invention is to add adsorptive materials between the flat cable 216 and the bottom 211 of the housing 210. The adsorptive materials can be the first adsorptive slice 220 and the second adsorptive slice 230 as shown in FIG. 2A and FIG. 2B. The adsorptive materials can be magic felts adhere to each other section by section as shown in FIG. 2C or soft magnetic slices with slight magnetism provided that the magnetism does not affect the movement of the flat cable 216.

When the photoelectric sensing device 214 carries the flat cable 216 and moves to pre-scan or scan the to-be-scanned document 215, the touching area between the flat cable 216 and the bottom 211 of the housing will change. The first adsorptive slice 220 and the second adsorptive slice 230 corresponding to the touching area between the flat cable 216 and the bottom 211 adsorb each other. Therefore, the raised part 118 of the flat cable 114 in prior art will not touch the loading glass 213 and the quality of the scanning image can be improved.

The scanning apparatus according to the invention has a simple and novel design. The raised part of the flat cable in the prior art fails to rub against the loading glass by adding adsorptive materials between the flat cable and the bottom of the housing. Thus, the improved scanning apparatus optimizes the quality of the scanning image.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus having a housing with a scan flatbed, a loading glass being installed at the scan flatbed for loading a to-be-scanned document, the scanning apparatus comprising:

a photoelectric sensing device, disposed in the housing, for sensing a light signal corresponding to the to-be-scanned document to generate an electric signal;

a circuit board, disposed in the housing, for receiving the electric signal; and a flat cable comprising a first adsorptive slice, for connecting the photoelectric sensing device to the circuit board and transmitting the electric signal; and a second adsorptive slice being stuck on a bottom of the housing;

wherein a touching area between the flat cable and the bottom of the housing changes as the photoelectric sensing device shifts; and the first absorptive slice and the second absorptive slice corresponding to the touching area adsorb each other.

2. The scanning apparatus according to claim 1, wherein the photoelectric sensing device comprises a contact image sensor (CIS).

3. The scanning apparatus according to claim 1, wherein the photoelectric sensing device comprises a charge coupled device (CCD).

4. The scanning apparatus according to claim 1, wherein the to-be-scanned document is a reflective document.

5. The scanning apparatus according to claim 1, wherein the to-be-scanned document is a transmissive document.

6. The scanning apparatus according to claim 1, wherein the circuit board is a motherboard.

7. The scanning apparatus according to claim 1, wherein materials of the first and the second adsorptive slices are magic felts.

8. The scanning apparatus according to claim 7, wherein the first and the second adsorptive slices adhere to each other section by section.

9. The scanning apparatus according to claim 1, wherein materials of the first and the second adsorptive slices are soft magnetic slices with slight magnetism.

10. A flat cable for being installed in a housing of a scanning apparatus, the housing having a bottom, the flat cable comprising:

a cable; and a first adsorptive slice, being located beneath the cable and facing the bottom of the housing;

wherein a second adsorptive slice is stuck on the bottom of the housing, and the first absorptive slice and the second absorptive slice corresponding to a touching area between the flat cable and the bottom of the housing adsorb each other.

11. The scanning apparatus according to claim 10, wherein materials of the first and the second adsorptive slices are magic felts.

12. The scanning apparatus according to claim 11, wherein the first and the second adsorptive materials adhere to each other section by section.

13. The scanning apparatus according to claim 10, wherein materials of the first and the second adsorptive slices are soft magnetic slices with slight magnetism.

* * * * *